(No Model.)
B. CHALONER & E. E. LICHTENBERGER.
FLOUR GOLD SAVER.
No. 604,653. Patented May 24, 1898.
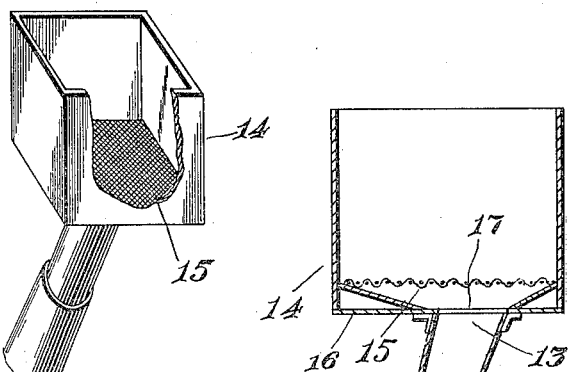
Fig. 1.
Fig. 2.
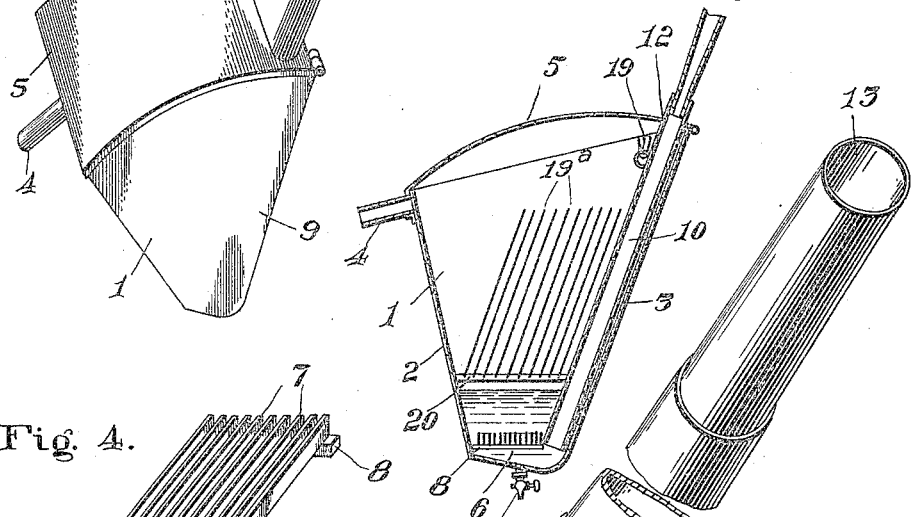
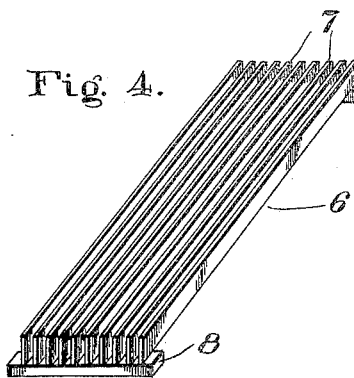
Fig. 4.
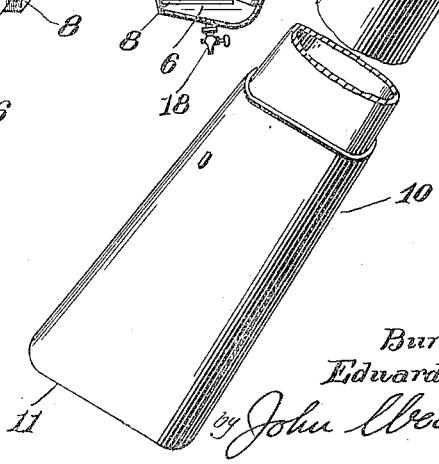
Fig. 3.
Witnesses
Chas. P. Heinemann.
Victor J. Evans
Inventors
Burt Chaloner.
Edward E. Lichtenberger.
by John Wedderburn.
Attorney

UNITED STATES PATENT OFFICE.

BURT CHALONER AND EDUARD E. LICHTENBERGER, OF ANACONDA, COLORADO.

FLOUR-GOLD SAVER.

SPECIFICATION forming part of Letters Patent No. 604,653, dated May 24, 1898.

Application filed September 20, 1897. Serial No. 652,351. (No model.)

*To all whom it may concern:*

Be it known that we, BURT CHALONER and EDUARD E. LICHTENBERGER, citizens of the United States, residing at Anaconda, in the county of El Paso and State of Colorado, have invented certain new and useful Improvements in Flour-Gold Savers; and we do hereby declare the following to be a full, clear, and exact description of the invention, such as will enable others skilled in the art to which it appertains to make and use the same.

This invention relates to a novel device for separating small particles of precious metal from tailings, and has for its object the production of a simple device by means of which fines, slimes, or the like may be rescued from the tailings or refuse resulting from the usual or separating operations without the employment of devices which require the services of experts. To the accomplisment of this object and others subordinate thereto our invention consists in providing a separating-trough with a dividing-plate submerged in mercury at the bottom of the trough and in providing a feed or distributing pipe of peculiar construction designed to convey the tailings through the tail-race or sluice to the trough and a screen-box within which the tailings are screened before passing out of the separator-trough in a manner to be made apparent.

Referring to the drawings, Figure 1 is a perspective view of our device complete. Fig. 2 is a central transverse section through the subject-matter of Fig. 1. Fig. 3 is a detail view of the feed-pipe or distributer, and Fig. 4 is a similar view of the dividing-plate.

Referring to the numerals on the drawings, 1 indicates a galvanized-iron or other suitable trough, said trough being somewhat elongated and provided with downwardly-converging front and rear walls 2 and 3, and with a discharge-nozzle 4 at the upper edge of its front wall 2, and with a cover 5, hinged or otherwise secured to the trough.

6 indicates what we will term a "dividing-plate," composed of parallel iron or other suitable bars 7, slightly separated and supported within the trough at a slight distance above its bottom, as by brackets 8, secured to the end walls 9 of said trough. The dividing-plate is located close to the front wall of the trough to provide a suitable space between its rear edge and the rear wall of the trough for the passage of the tailings, which are conveyed into the trough and are deposited below the dividing-plate by a feed-pipe or distributer 10, the lower end 11 of which is of a length corresponding to the length of the box and of a width corresponding to the space between the rear wall of the trough and the contiguous edge of the dividing-plate 6 and is of preferably elliptical form, as illustrated. The distributer extends upwardly from the dividing-plate, upon which it rests, through an opening 12 in the cover and gradually assumes a cylindrical form at its upper end 13, upon which is mounted a screen-box 14, provided with a screen 15, immediately above its bottom 16, which latter is provided with a central aperture 17, designed to receive the extremity 13 of the distributer or supply-pipe, which latter is preferably composed of a number of telescopic sections designed to facilitate the packing and transportation of the apparatus. Any suitable means for withdrawing the mercury from the trough may be provided—as, for instance, a drip-cock 18—and hooks 19 are preferably carried by the trough to engage eyes upon the distributer for the purpose of securing the latter in place.

In practice a sufficient quantity of mercury is placed within the bottom of the trough to submerge the dividing-plate, and the screen-box 14 is placed under the end of the tail-race or sluice-box to receive the tailings therefrom. The tailings are caused to pass through the screen 15, which removes any debris which may be contained therein, and passes thence through the distributer and is projected into the trough below the dividing-plate along the entire length of the trough. The force of the column of water carrying the tailings will cause the latter to be forced upwardly through the dividing-plate, which will divide the fluid in thin sheets, exposing the particles of metal to the mercury, which will retain them in a manner well understood by those skilled in the art, and the water, sand, and other particles will flow upwardly and will finally escape through the discharge-nozzle 4.

19ª indicates a series of amalgamator-plates arranged within the trough preferably inclined with the feed-pipe and supported by suitable brackets 20, located above the surface of the quicksilver. This in effect forms a zigzag passage or series of passages, increasing the travel of the pulp in contact with amalgamated surfaces and increases the efficiency of the amalgamator.

Mercury may be withdrawn from the drip-cock and retorted for the purpose of separating the fines therefrom in the usual manner. If desired, however, the drip-cock may be omitted and the mercury may be poured through the trough when it is desired to retort the same.

While the present embodiment of our invention appears at this time to be preferable, we do not desire to limit ourselves to the details of construction herein shown and described, but reserve the right to change, modify, or vary them at will within the scope of our invention.

Having thus described our invention, what we claim as new, and desire to secure by Letters Patent, is—

1. In a flour-gold saver, the combination of a trough or receptacle for mercury, a distributer or feed-chute discharging into the trough, and a dividing-plate composed of a series of parallel bars forming narrow, parallel openings arranged within the trough below the surface of the mercury, and a series of parallel, inclined, amalgamated plates in the receptacle above and inclined with relation to the dividing-plate and away from the discharge side, whereby the material passing through the amalgamator is forced to take a zigzag or sinuous path between the amalgamated surfaces, substantially as described.

2. The combination of a trough or receptacle having downwardly-converging front and rear walls, a discharge-port in the upper part of the front wall, a feed-chute having a narrow, elliptical mouth or discharge-orifice in the lower part of the rear wall, a dividing-plate composed of a series of bars forming narrow parallel openings arranged in the trough below the surface of the mercury, of a series of amalgamated plates in the receptacle above the mercury, inclined away from the discharge side whereby the material passing through the amalgamator is forced to take a zigzag or sinuous path between the amalgamated surfaces, substantially as described.

In testimony whereof we have signed this specification in the presence of two subscribing witnesses.

BURT CHALONER.
EDUARD E. LICHTENBERGER.

Witnesses:
GEO. H. PHELPS,
C. L. CLEANER.